(12) United States Patent
Aou et al.

(10) Patent No.: US 10,294,391 B2
(45) Date of Patent: *May 21, 2019

(54) PROCESS FOR MAKING URETHANE-ISOCYANURATES

(71) Applicant: Dow Global Technologies LLC, Midland, MI (US)

(72) Inventors: Kaoru Aou, Lake Jackson, TX (US); Juan Carlos Medina, Lake Jackson, TX (US); Rajesh P. Paradkar, Lake Jackson, TX (US); Dwight Latham, Clute, TX (US); Michelle Tipps-Thomas, Richwood, TX (US)

(73) Assignee: Dow Global Technologies LLC, Midland, MI (US)

(*) Notice: Subject to any disclaimer, the term of this patent is extended or adjusted under 35 U.S.C. 154(b) by 286 days.

This patent is subject to a terminal disclaimer.

(21) Appl. No.: 14/896,444

(22) PCT Filed: Jul. 9, 2014

(86) PCT No.: PCT/US2014/045854
§ 371 (c)(1),
(2) Date: Dec. 7, 2015

(87) PCT Pub. No.: WO2015/006391
PCT Pub. Date: Jan. 15, 2015

(65) Prior Publication Data
US 2016/0122582 A1     May 5, 2016

Related U.S. Application Data

(60) Provisional application No. 61/844,986, filed on Jul. 11, 2013.

(51) Int. Cl.

| | |
|---|---|
| *C09D 175/08* | (2006.01) |
| *C08G 18/48* | (2006.01) |
| *C08J 5/04* | (2006.01) |
| *C08G 18/76* | (2006.01) |
| *C08G 18/79* | (2006.01) |
| *C08G 18/09* | (2006.01) |
| *C08G 18/10* | (2006.01) |
| *C08G 18/16* | (2006.01) |
| *C08G 18/18* | (2006.01) |
| *C08G 18/24* | (2006.01) |
| *C08G 18/30* | (2006.01) |
| *C08G 18/40* | (2006.01) |
| *C09D 5/00* | (2006.01) |
| *C09D 175/04* | (2006.01) |

(52) U.S. Cl.
CPC ......... *C09D 175/08* (2013.01); *C08G 18/092* (2013.01); *C08G 18/10* (2013.01); *C08G 18/163* (2013.01); *C08G 18/1875* (2013.01); *C08G 18/246* (2013.01); *C08G 18/302* (2013.01); *C08G 18/409* (2013.01); *C08G 18/4825* (2013.01); *C08G 18/4841* (2013.01); *C08G 18/7664* (2013.01); *C08G 18/794* (2013.01); *C08J 5/04* (2013.01); *C09D 5/00* (2013.01); *C09D 175/04* (2013.01); *C08G 2125/00* (2013.01); *C08G 2261/60* (2013.01); *C08J 2375/04* (2013.01)

(58) Field of Classification Search
CPC ...... C09D 175/08; C09D 5/00; C09D 175/04; C08G 18/092; C08G 18/10; C08G 18/163; C08G 18/1875; C08G 18/246; C08G 18/302; C08G 18/409; C08G 18/4825; C08G 18/18; C08G 18/4841; C08G 18/7664; C08G 18/794; C08G 2125/00; C08G 2261/60; C08J 5/04; C08J 2375/04

See application file for complete search history.

(56) References Cited

U.S. PATENT DOCUMENTS

| | | |
|---|---|---|
| 3,378,511 A | 4/1968 | Newton |
| 3,914,198 A | 10/1975 | Olstowski |
| 3,966,664 A | 6/1976 | Olstowski |
| 4,122,058 A | 10/1978 | Olstowski |
| 4,438,254 A | 3/1984 | Doorakian et al. |
| 4,480,082 A | 10/1984 | McLean et al. |
| 5,002,806 A | 3/1991 | Chung |
| 5,089,588 A | 2/1992 | White et al. |
| 5,115,075 A | 5/1992 | Brennan et al. |
| 5,171,820 A | 12/1992 | Mang et al. |
| 5,246,751 A | 9/1993 | White et al. |
| 5,455,287 A | 10/1995 | Carpenter et al. |
| 8,785,570 B2 | 7/2014 | Bleys et al. |

(Continued)

FOREIGN PATENT DOCUMENTS

FR     2654385 A1     5/1991

OTHER PUBLICATIONS

Javni, I. et al, Soybean Oil Based Polyisocyanurate Cast Resins, J of Applied Polymer Science, 2003, 3333-3337, V90.

(Continued)

*Primary Examiner* — Robert S Walters, Jr.

(57) ABSTRACT

A method for exposing a substrate to water under superatmospheric pressure at a temperature of at least 70° C. includes (a) applying a reaction mixture to a substrate, which reaction mixture has an isocyanate index of at least 10 and includes an aromatic polyisocyanate component, a polyol component having a polyol with a hydroxyl equivalent weight of at least 500, and a catalyst component having an isocyanate trimerization catalyst, and at least partially curing the reaction mixture to form a polyisocyanurate or polyurethane-isocyanurate polymer having a glass transition temperature of at least 80° C., and (b) exposing the substrate and the polyisocyanurate or polyurethane-isocyanurate polymer to water under superatmospheric pressure at a temperature of at least 70° C.

13 Claims, No Drawings

(56) References Cited

U.S. PATENT DOCUMENTS

| | | |
|---|---|---|
| 2003/0224179 A1 | 12/2003 | Skinner et al. |
| 2006/0084777 A1 | 4/2006 | Bleys et al. |
| 2008/0227929 A1 | 9/2008 | Jozef et al. |
| 2009/0005517 A1 | 1/2009 | Bleys et al. |
| 2011/0020170 A1 | 1/2011 | Luinstra et al. |
| 2011/0213044 A1 | 9/2011 | Van der Wal et al. |
| 2016/0122582 A1 | 5/2016 | Aou et al. |

OTHER PUBLICATIONS

PCT/US2014/045854, International Search Report and Written Opinion dated Dec. 16, 2014.
PCT/US2014/045854, International Preliminary Report on Patentability dated Jan. 21, 2016.

PROCESS FOR MAKING URETHANE-ISOCYANURATES

FIELD

Embodiments relate to polyisocyanurate and polyurethane-isocyanurate polymers, and methods for making polyisocyanurate and polyurethane-isocyanurate polymers, which are adapted for coating substrates.

BACKGROUND

Phenolic-formaldehyde resins have been in use for over a century. These materials are very hard organic polymers. They are used, e.g., in circuit boards, many types of electrical laminates, countertops, bearings, binders in friction surfaces (such as brake pads, brake shoes, and clutch disks), billiard and snooker balls, and other applications where hardness (such as in an outer shell) is a desirable attribute.

These polymers often contain residual formaldehyde, which may outgas during its service life and create exposure issues. For this reason, there is a strong push to find alternative materials. However, few other organic polymers may match the hardness of phenolic-formaldehyde type resins.

In some applications, phenolic-formaldehyde resins are subjected to conditions of high temperature, elevated pressures, and moisture. Examples of these applications include, e.g., composite materials used as conduits for high-temperature water and/or steam, certain undersea applications, and coatings for materials that are exposed during use to steam or high temperature water. Under those conditions, the resins exhibit a loss of properties, and may lose mass to the surrounding moisture. For example, when phenolic-formaldehyde resins are immersed in high temperature water, decomposition products are often seen leaching into the water, leading to the water turning milky white. For these applications, an alternative polymer that maintains its properties better is sought.

SUMMARY

Embodiments may be realized by providing a method for exposing a substrate to water under superatmospheric pressure at a temperature of at least 70° C. The method includes (a) applying a reaction mixture to a substrate, which reaction mixture has an isocyanate index of at least 10 and includes an aromatic polyisocyanate component, a polyol component having a polyol with a hydroxyl equivalent weight of at least 500, and a catalyst component having an isocyanate trimerization catalyst, and at least partially curing the reaction mixture to form a polyisocyanurate or polyurethane-isocyanurate polymer having a glass transition temperature of at least 80° C. The method also includes (b) exposing the substrate and the polyisocyanurate or polyurethane-isocyanurate polymer to water under superatmospheric pressure at a temperature of at least 70° C.

DETAILED DESCRIPTION

A polyisocyanurate or polyurethane-isocyanurate polymer in the form of a coating may be formulated to maintain its properties even when immersed in high temperature water, e.g., when immersed in water under superatmospheric pressure at a temperature of at least 70° C. The polyisocyanurate or polyurethane-isocyanurate polymer has a glass transition temperature of at least 80° C. According to exemplary embodiments, the glass transition temperature of the polyisocyanate or polyurethane-isocyanurate polymer increases as a result of exposure to a high temperature (e.g., a temperature of at least 70° C.) while being immersed in water. This effect is very surprising and not easily accounted for, and is contrary to the performance of phenolic-formaldehyde resins.

According to exemplary embodiments, a stage (a) in a method of forming the polyisocyanurate or polyurethane-isocyanurate polymer includes curing a reaction mixture, which includes an aromatic polyisocyanate component, a polyol component having a polyol that has a hydroxyl equivalent weight of at least 500, and a catalyst component having an isocyanate trimerization catalyst, in which reaction mixture the isocyanate index is at least 10. The polyisocyanurate or polyurethane-isocyanurate polymer formed according to exemplary embodiments, is highly resistant to the conditions encountered in immersion in water at elevated temperatures. Accordingly, after curing the reaction mixture that forms the polyisocyanurate or polyurethane-isocyanurate polymer, a stage (b) includes exposure of the polyisocyanurate or polyurethane-isocyanurate polymer to water under superatmospheric pressure at a temperature of at least 70° C. The high temperature water exposure stage (b) may be performed during the use of the polyisocyanurate or polyurethane-isocyanurate polymer in its intended application, or as a separate manufacturing stage unconnected to its ultimate use. Full curing of the reaction mixture in stage (a) may be performed prior to stage (b) or concurrently with stage (b), e.g., the polyisocyanurate or polyurethane-isocyanurate polymer in stage (a) may only be partially cured prior to being exposed to water under superatmospheric pressure at a temperature of at least 70° C.

The reaction mixture in stage (a) includes an aromatic polyisocyanate component that has at least one aromatic polyisocyanate. The aromatic polyisocyanate may have an average isocyanate functionality from 1.9 to 4 (e.g., 2.0 to 3.5, 2.8 to 3.2, etc.). The aromatic polyisocyanate may have an average isocyanate equivalent weight from 80 to 160 (e.g., 120 to 150, 125 to 145, etc.).

Exemplary aromatic polyisocyanates include m-phenylene diisocyanate, 2,4- and/or 2,6-toluene diisocyanate (TDI), the various isomers of diphenylmethanediisocyanate (MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane triisocyanate, polymethylene polyphenylisocyanates, toluene-2,4,6-triisocyanate, and 4,4'-dimethyl diphenylmethane-2,2', 5,5'-tetraisocyanate. Derivatives of any of the foregoing that have, e.g., at least one selected from the group of urea, urethane, carbodiimide, biuret, allophanate, and uretonimine linkages, are also useful. According to exemplary embodiments, the reaction mixture of stage (a) includes at least one selected from the group of MDI, so-called 'polymeric MDI' products that are mixtures of MDI and polymethylene polyphenylisocyanates, and derivatives of MDI such as biuret- and/or allophanate-modified "liquid" MDI products, and other MDI derivatives that have, e.g., urea, urethane, carbodiimide, biuret, allophanate and uretonimine linkages.

The reaction mixture in stage (b) also includes a polyol component that includes at least one polyol that has a hydroxyl equivalent weight of at least 500. In some embodiments, the hydroxyl equivalent weight is from 500 to 20,000 (e.g., 800 to 5,000, etc.). The polyol contains from 1 to 8 hydroxyl groups per molecule, e.g., from 2 to 4 hydroxyl groups per molecule. The polyol may have a hydroxyl equivalent weight of at least 500, at least 800, or at least 1,000.

The polyol may include an alkoxylate of any of the following molecules, e.g., ethylene glycol, diethylene glycol, triethylene glycol, 1,2-propanediol, dipropylene glycol, tripropylene glycol, 1,4-butanediol, 1,6-hexanediol, glycerin, trimethylolpropane, trimethylolethane, pentaerythritol, erythritol, sorbitol, sucrose, cyclohexanedimethanol, triethanolamine, and the like. The alkoxylate may be formed by adding at least one selected from the group of propylene oxide, ethylene oxide, and butylene oxide (such as 1,2-butylene oxide and 1,4-butylene oxide) to the respective polyol. According to an exemplary embodiment, the alkoxylate may contain up to 20 wt %, up to 25 wt %, up to 30 wt %, up to 35 wt %, or up to 40% of ethylene oxide based on a total weight of the alkoxylate. According to another exemplary embodiment, the polyol contains a terminal ethylene oxide block.

Alkoxylates of ammonia or primary or secondary amine compounds such as aniline, toluene diamine, ethylene diamine, diethylene triamine, piperazine, aminoethylpiperazine, and the like, which have a hydroxyl equivalent weight of at least 500, at least 800, or at least 1,000 are also useful. The alkoxylate may have a hydroxyl equivalent weight of up to 5000, or up to 10,000.

Polyester polyols having a hydroxyl equivalent weight of at least 500, at least 800, or at least 1,000 are also useful.

Polyols with fillers (filled polyols) may be used as well, where the hydroxyl equivalent weight is at least 500, at least 800, or at least 1,000. The filled polyols may contain one or more copolymer polyols with polymer particles as a filler dispersed within the copolymer polyols. Exemplary filled polyols include styrene/acrylonitrile (SAN) based filled polyols, polyharnstoff dispersion (PHD) filled polyols, and polyisocyanate polyaddition products (PIPA) based filled polyols. For example, filled polyols are taught in *Chemistry and Technology of Polyols for Polyurethanes*, Rapra Technology Limited, 2005, pages 185-227, and are taught in Herrington and Hock, *Flexible Polyurethane Foams*, The Dow Chemical Company, 1991, pages 2.10-2.14. Also, filled polyols such as mechanically dispersed copolymer polyol may be used, e.g., as described in U.S. Patent Publication No. 2011/0213044.

In certain embodiments, one or more copolymer polyols (e.g., copolymer polyols that are known in the art) contain dispersed styrene/acrylonitrile (SAN) particles dispersed therein, and the dispersed polymer particles may be obtained by in-situ polymerization of acrylonitrile and styrene. For example, the one or more copolymer polyols contain from 20 wt % to 50 wt % (e.g., 30 wt % to 40 wt %, 35 wt % to 40 wt %, etc.) of solid styrene acrylonitrile particles, based on a total weight of the filled polyol. The styrene acrylonitrile particles may have a particle size from 1 to 2 microns. The carrier polyol for the copolymer polyols may have a nominal functionality of 2 or 3 (e.g., the copolymer polyols may be a triol).

One or more of the aforementioned polyols may be used in combination, with a combined number average hydroxyl equivalent weight of at least 500, at least 800, or at least 1,000.

The isocyanate index of the reaction mixture that includes the aromatic polyisocyanate and the one or more polyols is at least 10, and may be at least 20, at least 50, at least 100, at least 150, at least 200, at least 250, or at least 300. Isocyanate index here is the stoichiometric ratio of the isocyanate functional groups to the active hydrogens in the polyol/isocyanate formulation. The aromatic polyisocyanate should contain an average of at least 2 (e.g., from 2 to 3.5) isocyanate groups per molecule.

According to embodiments, the reaction mixture including the polyisocyanate component and the polyol component are cured in the presence of a catalyst component, which includes an isocyanate trimerization catalyst. Although the aromatic polyisocyanate may possibly be cured by itself, the reaction mixture may be cured using a trimerization catalyst. A polyol in the polyol component (e.g., a filled polyol) may be a reactive carrier for the trimerization catalyst. For example, instead of using an inert carrier (or no carrier) for the trimerization catalyst, a polyol used in the formation of the polyisocyanurate or polyurethane-isocyanurate polymer may act as a reactive carrier of the trimerization catalyst. The catalyst component may optionally include a urethane catalyst, i.e., a catalyst for the reaction of an isocyanate with a hydroxyl group, may be used in addition to the trimerization catalyst. For example, when the polyol does not have any primary hydroxyl groups, the urethane catalyst may be included in the catalyst component.

Trimerization catalysts include, e.g., strong bases such as alkali metal phenolates, alkali metal alkoxides, alkali metal carboxylates, quaternary ammonium salts, and the like. Among the alkali metal trimerization catalysts are sodium p-nonylphenolate, sodium p-octyl phenolate, sodium p-tert-butyl phenolate, sodium formate, sodium acetate, sodium propionate, sodium butyrate, sodium 2-ethylhexanoate, glycine N-[(2-hydroxy-5-nonylphenyl)methyl]-N-methyl-monosodium salt, potassium p-nonylphenolate, potassium p-octyl phenolate, potassium p-tert-butyl phenolate, potassium formate, potassium acetate, potassium propionate, potassium butyrate, potassium 2-ethylhexanoate, glycine N-[(2-hydroxy-5-nonylphenyl)methyl]-N-methyl-monopotassium salt, cesium p-nonylphenolate, cesium p-octyl phenolate, cesium p-tert-butyl phenolate, cesium formate, cesium acetate, cesium propionate, cesium butyrate, cesium 2-ethylhexanoate and glycine N-[(2-hydroxy-5-nonylphenyl)methyl]-N-methyl-monocesium salt. Among the useful ammonium salts are (2-hydroxypropyl)trimethylammonium 2-ethylhexanoate, (2-hydroxypropyl)trimethylammonium formate and the like Aminophenolic compounds such as N,N',N"-tris(3-dimethylaminopropyl)hexahydro-s-triazine are also useful trimerization catalysts. Imidazolium or imidazolinium salts may also be used as trimerization catalysts, such as 1-ethyl, 2-methyl-imidazolium acetate, 1,3-di-tert-butyl-imidazolinium acetate, 1,3-diadamantyl-imidazolium acetate, 1,3-diisopropyl-imidazolium acetate 1,3-di-tert-butyl-imidazolium acetate, 1-butyl-3-methylimidazolium acetate, and others disclosed (e.g., as disclosed in U.S. Patent Publication No. 2011/0020170). For example, the alkali metal and/or ammonium compounds may be used.

Examples of urethane catalysts include various amines, tin carboxylates, organotin compounds, tertiary phosphines, various metal chelates, metal salts of strong acids (such as ferric chloride, stannic chloride, stannous chloride, antimony trichloride, bismuth nitrate, and bismuth chloride), and the like. For example, the amine and tin catalysts may be used. The amine catalysts may not contain amine hydrogens.

Amine catalysts include, e.g., trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl)ether, morpholine, 4,4'-(oxydi-2, 1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl)ether, N,N-bis(3-dimethylaminopropyl)N-isopropanolamine, (N,N-dimethyl)aminoethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethyl amine)ethyl)ether, tris(dimethylamino propyl)amine, dicyclohexyl methyl amine, bis(N,N-dimethyl-3-aminopropyl)amine, 1,2-ethylene piperidine, and methyl-hydroxyethyl piperazine.

Useful tin-containing catalysts include, e.g., stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

The trimerization catalyst may be present, e.g., in an amount from 0.01 to 15 parts (e.g., 0.05 to 1, 0.1 to 0.5, etc.) by weight, based on a total of 100 parts of the combined weight of the polyisocyanate component and the polyol component. The urethane catalyst, when present, may be present in similar amounts as the trimerization catalyst, e.g., in an amount from 0.01 to 15 parts (e.g., 0.05 to 1, 0.1 to 0.5, etc.) by weight, based on the total of 100 parts of the combined weight of the polyisocyanate component and the polyol component.

Various optional ingredients may be included in the reaction mixture during stage (a) of the process. For example, reinforcing agents such as fibers and flakes that have an aspect ratio (ratio of largest to smallest orthogonal dimension) of at least 5 may be used. These fibers and flakes may be, e.g., an inorganic material such as glass, mica, other ceramic fibers and flakes, carbon fibers, organic polymer fibers that are non-melting and thermally stable at the temperatures encountered in stages (a) and (b) of this process (such as polyamide fibers), and the like. Another useful optional ingredient is a low aspect ratio particulate filler. Such a filler may be, e.g., sand, clay, other minerals, or an organic polymer that is non-melting and thermally stable at the temperatures encountered in stages (a) and (b) of the process. Such a particulate filler has a particle size (as measured by sieving methods) of less than 100 μm.

Another optional ingredient includes a liquid epoxy resin. The liquid epoxy resin may be added in amounts up to 20 wt %, based on the total weight of the reaction mixture. Exemplary liquid epoxy resins include the glycidyl polyethers of polyhydric phenols and polyhydric alcohols. For example, the diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A, and any combination thereof may be included in the reaction mixture.

The liquid epoxy resin may be a diepoxide. Examples of diepoxides that may be added to the reaction mixture include diglycidyl ether of 2,2-bis(4-hydroxyphenyl) propane (generally referred to as bisphenol A) and diglycidyl ether of 2,2-bis(3,5-dibromo-4-hydroxyphenyl) propane (generally referred to as tetrabromobisphenol A). Mixtures of any two or more diepoxides may be used. Other diepoxides that may be employed include the diglycidyl ethers of dihydric phenols, such as those described in U.S. Pat. Nos. 5,246,751; 5,115,075; 5,089,588; 4,480,082 and 4,438,254. Further, the diglycidyl esters of dicarboxylic acids such as those described in U.S. Pat. No. 5,171,820, may be employed. Other suitable diepoxides include, e.g., αω-diglycidyloxy-isopropylidene-bisphenol-based epoxy resins such as those commercially known as D.E.R.® 300 and 600 series epoxy resins (available from The Dow Chemical Company).

Still other useful optional ingredients include colorants, biocides, UV stabilizing agents, preservatives, antioxidants, surfactants, and the like. Although it is possible to include a blowing agent into the reaction mixture, in some embodiments the blowing agent is excluded from the reaction mixture.

The polyisocyanurate or polyurethane-isocyanurate polymer formed in stage (a) may be a substantially non-cellular polymer having a density of at least 500 kg/m$^3$, at least 750 kg/m$^3$, or at least 950 kg/m$^3$. For example, the polyisocyanurate or polyurethane-isocyanurate polymer formed in stage (a) may have a density up to 1,000 kg/m3. The density of the polymer has been found to change at most insignificantly during stage (b). Therefore, in exemplary embodiments the polymer obtained from stages (b) of the process also is substantially non-cellular as well, and has a density of at least 500 kg/m$^3$, at least 750 kg/m$^3$, or at least 950 kg/m$^3$.

The aromatic polyisocyanate(s) or mixture thereof with the polyol(s) is cured in stage (a). For example, methods for performing such polymerizations that are known in the art may be used. According to exemplary embodiments, the reactants and catalysts as described above are combined, and then heated to an elevated temperature at which the trimerization of isocyanate groups proceeds. The elevated temperature may be, e.g., at least 50° C. (and may be up to 180° C.).

The glass transition temperature of the polymer obtained from this first polymerization stage is at least 80° C., at least 120° C., at least 160° C., or at least 180° C. According to an exemplary embodiment, the glass transition temperature may be as high as 250° C., e.g., the glass transition temperature after stage (a) may be in a range between 160° C. to 250° C. (e.g., 180° C. to 245° C., 200° C. to 235° C., 210° C. to 225° C., etc.). The glass transition temperature is measured by dynamic mechanical thermal analysis (DMTA) at an oscillation frequency of 1 Hertz and a heating scan rate at 3° C./second from 20° C. to 200° C. The temperature corresponding to the peak of the tan delta curve is taken as the glass transition temperature ($T_g$) of the specimen tested.

The polymerization in stage (a) may be performed in various ways. If a molded product is desired, the reaction mixture may be introduced into a suitable mold and cured therein. The reaction mixture may be applied onto the surface of any suitable substrate and cured thereon to form a coating thereon. The reaction mixture may be used to impregnate a substrate material or a reinforcing material, and then cured in the presence of the substrate to form a composite.

This polymerization in stage (a) may be performed in two or more sub-steps. For example, the reaction mixture may be cured to its gel point in a first sub-step, advancing the cure enough to form a semi-solid or solid material that may be manipulated and/or further shaped prior to a subsequent curing sub-step that leads to the development of a high glass transition temperature polymer as described before. This method is suitable, e.g., for forming various types of reinforced composites. This method is also amenable for making molded products. The reaction mixture may be polymerized in a mold until the polymer has obtained sufficient strength to allow it to be demolded without permanent distortion or damage, and then post-cured outside of the mold to complete the polymerization step.

The polyisocyanurate or polyurethane-isocyanurate polymer obtained from stage (a) is exposed to water at superatmospheric pressure at a temperature of at least 70° C. in a stage (b). The temperature during stage (b) may be as high as 180° C. (e.g., but may not exceed 160° and/or is up to 140° C. According to an exemplary embodiment, the temperature during stage (b) is from 100° C. to 130° C. The pressure in stage (b) is greater than 1 atmosphere (101.325 kPa) and may be any higher value. However, pressures greater than 100 atmospheres may not provide additional benefit. The pressure may range from, e.g., 150 kPa to 5000 kPa, 200 kPa to 5000 kPa, etc.

In stage (b), the water may be provided in the form of a liquid and/or a gas. If provided as a gas, the atmosphere may be saturated or super-saturated with water. At least a part of the water may be provided as a liquid. If the temperature is 100° C. or above, the superatmospheric pressure may be sufficient to maintain the water at least partially as a liquid.

The treatment time for stage (b) of the process may range from, e.g., an hour to many days or longer. Stage (b) may be performed continuously during the entire length of use of the material. If stage (b) is performed separately, it may be performed, for example for a period of one hour to 15 days (e.g., from a period being 12 hours to 10 days). According to exemplary embodiments, stage (b) is performed for a period of time sufficient to increase the glass transition temperature of the polyisocyanurate or polyurethane-isocyanurate polymer, by at least 5° C.

Stage (b) of the process may be performed as a separate production step, i.e., as a manufacturing step that is performed apart from and prior to the use of the polymer in its intended application. However, in many cases, stage (b) is performed in the course of the ordinary use of the polymer. For example, the polymer may be used under high temperature, superatmospheric humid or aqueous conditions, which satisfy the requirements of stage (b) of the process. As before, if the water is in the form of a gas, the gas may be saturated or super-saturated with the water. Examples of such end uses include autoclavable coatings, piping or other conduits for hot aqueous fluids (such as undersea production conduits), chemical process piping, cooling water conduits, or other applications in which the product is exposed to conditions of high temperature and high humidity or liquid water.

A surprising feature of embodiments is that the polymer formed in stage (a) is quite resistant to the loss of physical properties upon exposure to water and high temperatures as seen in stage (b). Often, the glass transition temperature of the polymer actually increases during stage (b), which is quite surprising and unexpected. This increase in glass transition temperature is not easily accounted for. Even when the glass transition temperature does not increase, it may remain nearly constant or at most decrease only slightly. Typically, the polyisocyanurate or polyisocyanurate-urethane polymer obtained after stage (b) has a glass transition temperature of at least 150° C., and may be from 160 to 250° C. (e.g., from 160 to 220° C.).

The polyisocyanurate or polyurethane-isocyanurate polymer is formed as a coating onto a substrate. The substrate may be any convenient size and geometry ranging from large blocks to fibers to particulates (such as sand particles, ceramic based particles, bauxite particles, and glass beads). Such a particulate substrate may have a particle size as measured by sieving methods of at least 100 µm. The coating of the polyisocyanurate or polyurethane-isocyanurate polymer may be formed by applying the reaction mixture as described above to a surface or surfaces of the substrate, and the performing stages (a) and (b) as described above while the reaction mixture is on the substrate surface(s). Such a coating operation may be performed in a mold (which is suitable for larger substrates) or may be performed using various spraying, painting or other coating techniques to apply the reaction mixture to the surface of the substrate. According to exemplary embodiments, the substrate may be coated by immersion in the reaction mixture.

To form a coated particulate, the reaction mixture may be applied to the substrate using any convenient method including those described above. Stage (a) of the process may then be performed by separating the reaction mixture-coated particles before performing the polymerization, and/or by agitating the substrate particles as the reaction mixture cures to prevent unwanted agglomeration. It is also possible to perform stage (a) on the reaction mixture-coated particles to form an agglomerated or partially agglomerated mass, which is then broken into individual pieces after stage (a) or stage (b) is completed.

A wide variety of materials may be used as such a substrate. All that is sought is that the substrate is a solid under the conditions of the coating process, and that the substrate does not dissolve or undesirably degrade or react under the conditions of the curing reaction. The substrate may react with one or more components of the reaction mixture, to form bonds between the substrate and the coating. Examples of substrates include, e.g., metals, ceramic materials, sand, clay, rock, stone, other organic polymers, wood, organic or inorganic fertilizer particles, other plant material, various composites materials, and the like. The coating thickness may range, e.g., from 0.1 µm to 15 cm or more, as desirable for the particular application. In specific applications, the coating thickness may be from 100 µm to 2.5 mm, or from 250 µm to 1 mm.

According to an exemplary embodiment, a reaction mixture as described before is applied to a substrate that is a fibrous reinforcement and then polymerized by performing stage (a) to form a fiber-reinforced composite. The fiber-reinforced composite in such a case will have a polymer phase, and a fiber phase that includes the fibrous reinforcement. The fiber phase is embedded in and bound together by the polyisocyanurate or polyurethane-isocyanurate polymer phase formed by polymerizing the reaction mixture. Such a fiber-reinforced composite is useful, e.g., as a conduit (such as for hot aqueous fluids and various gases and liquids), as a substrate for circuit boards, as a structural component (such as for vehicles, tools, and mechanized equipment), and the like. In making such composites, stage (b) may be performed during the normal use of the composite, in cases in which such use subjects the composite to conditions of temperature, pressure, and moisture as described herein. Alternatively, stage (b) may be performed as a separate manufacturing step.

EXAMPLES

The following examples are provided to illustrate exemplary embodiments, and are not intended to limit the scope thereof. All parts and percentages are by weight unless otherwise indicated.

The following materials are principally used in the mixtures:

| | |
|---|---|
| POLYOL A | A poly(propylene oxide) triol that has a hydroxyl equivalent weight of 85. |
| POLYOL B | A poly(propylene oxide) diol that has a hydroxyl equivalent weight of 1,000. |
| POLYOL C | A poly(propylene oxide) diol that has a hydroxyl equivalent weight of 2000. |
| POLYOL D | A poly(propylene oxide) diol that has a hydroxyl equivalent weight of 4000. |
| POLYOL E | A glycerol initiated propoxylated polyether polyol, having a nominal functionality of 3, a 15 percent ethylene oxide capping, and a hydroxyl equivalent weight of 2040. |
| FILLED POLYOL A | A polymer polyol containing dispersed polymer particles obtained by in-situ polymerization of acrylonitrile and styrene with a hydroxyl equivalent weight of approximately 2700, with a solids content of approximately 40 wt % (available from The Dow Chemical Company as DNC 701.01 Developmental Polyol). |
| FILLED POLYOL B | A polymer polyol containing dispersed polymer particles obtained by in-situ polymerization of acrylonitrile and styrene with a hydroxyl equivalent weight of approximately 1800, with a solids content of approximately 40 wt % (available from The Dow Chemical Company as VORALUX ™ HL 431). |
| POLY-ISOCYA-NATE A | A polymeric MDI having an isocyanate equivalent weight of 136.5 and a nominal isocyanate functionality of 3.0. |
| Trimer-ization Catalyst A | A (2-hydroxypropyl)trimethylammonium 2-ethylhexanoate salt solution in ethylene glycol (available from Air Products and Chemicals as DABCO ® TMR catalyst). |
| Urethane Catalyst A | A dibutyltin dilaurate catalyst (available from Air Products and Chemicals as DABCO ® T-12). |

Polyisocyanurate or polyurethane-isocyanurate polymers are prepared in the following general process:

For stage (a), the polyol (as shown in Tables 1 and 2, below) is charged into the mixing cup of a high-speed laboratory mixer (FlackTek SpeedMixer). The respect catalyst(s) from Tables 1 and 2, below, are then added and mixed thoroughly into the polyol at 800 rpm for 5 seconds, followed by 2000 rpm for 10 seconds. The corresponding polyisocyanate from Tables 1 and 2, below, is then added into the mixing cup and mixed with the other components at the same mixing condition. The resulting reaction mixture is emptied onto a circular steel mold 14 cm in diameter and 0.5 cm deep, which has been previously sprayed with a mold release agent (STONER E236 mold release from Stoner Inc., of Quarryville, Pa.). The amount of the reaction mixture in each case is 30 to 40 grams. The reaction mixture is allowed to cure without applied heat until it has cured enough to demold. The resulting molding is then, in each case, postcured under conditions of time and temperature as is indicated below in Table 1 (this process is termed "postcure").

Samples are cut from each molding (we also refer to these as the postcured samples). Specimens from the postcured samples are taken to dynamic mechanical thermal analysis (DMTA). DMTA measurements are made using an oscillation frequency of 1 sec$^{-1}$ and a heating rate of 3° C./minute. The glass transition temperature is taken in each case as the peak of the tan delta curve (peak tan delta $T_g$, or simply $T_g$). The storage modulus is measured at 50° C. and 121° C. The corrected G' is reported, where the G' at 121° C. is adjusted by a factor such that the G' at 50° C. would be corrected to $1 \times 10^9$ Pa. This is to account for the uneven surface of some of the plaques. The corrected value is reported as "Corrected 121° C. G'."

Stage (b), which we term "humid aging," is performed on samples cut from the moldings made in stage (a). The samples are immersed in deionized water in a 1-gallon Parr reactor. The headspace is charged to 500 psi with nitrogen and released three times to purge out residual oxygen. The headspace is then charged again to 500 psi with nitrogen and sealed. The sealed reactor is then heated to 121° C., and held there for seven days. At 121° C., the chamber pressure is approximately 650 psi. The reactor contents are allowed to come to room temperature. The samples are then removed and submerged in deionized water in a 50° C. oven until taken for DMTA analysis as with the postcured samples. Samples are removed from the 50° C. water bath immediately before DMTA analysis-such samples are referred to as humid aged. Glass transition temperature is measured, as is the storage modulus G' at both 50° C. and 121° C.

The formulations and test results for Comparative Examples A, B, and C, and for Examples 1, 2, and 3, are given in Table 1, below.

TABLE 1

| | Comp. Example A | Comp. Example B | Comp. Example C | Example 1 | Example 2 | Example 3 |
|---|---|---|---|---|---|---|
| | | | Parts by Weight | | | |
| Formulation | | | | | | |
| Polyol A | 21.0 | 16.0 | | | | |
| Polyol B | | | 30.2 | 3.8 | | |
| Polyol C | | | | | 3.8 | |
| Polyol D | | | | | | 3.8 |
| Polyisocyanate A | 29.5 | 29.6 | 6.4 | 30.0 | 30.0 | 30.0 |
| Trimerization Catalyst A | 0 | 0 | 0 | 0.50 | 0.50 | 0.50 |
| Urethane Catalyst A | 0.05 | 0.04 | 0.07 | 0.10 | 0.10 | 0.10 |
| Isocyanate Index | 0.88 | 1.15 | 1.55 | 58 | 116 | 231 |
| Postcure temperature (° C.)/time (min) | 80/30 | 147/33 | 80/10 | 120/60 | 120/60 | 120/60 |
| Properties | | | | | | |
| $T_g$ after postcure (° C.) | 158 | 162 | −39 | 153 | 90 | 93 |

TABLE 1-continued

|  | Comp. Example A | Comp. Example B | Comp. Example C | Example 1 | Example 2 | Example 3 |
|---|---|---|---|---|---|---|
|  |  |  | Parts by Weight |  |  |  |
| Corrected 121° C. G' on postcured sample ($10^8$ Pa) | 3.0 | 6.6 | Too soft to measure | 6.9 | 7.5 | 8.3 |
| $T_g$ after humid aging (° C.) | 105 | 128 | n/a | 202 | 248 | 220 |
| Corrected 121° C. G' on humid aged sample ($10^8$ Pa) | 0.1 | 0.3 | n/a | 3.9 | 7.3 | 7.6 |

Comparative Examples A and B show the effect of using a low equivalent weight polyol (i.e., Polyol A having a hydroxyl equivalent weight of 85) with an isocyanate index of near 1 to obtain a hard plaque in the dry condition. It is seen that after humid aging, the modulus dropped significantly, to below $1×10^8$ Pa. The results show a drop in the peak tan delta $T_g$ of 53° C. for Comparative Example A and a drop of 34° C. for Comparative Example B. Comparative Example C shows a case where a high equivalent weight polyol was used at an isocyanate index of near 1. In that case, the postcured sample had a very low $T_g$ of −39° C., and the material is too soft for the modulus at 121° C. to be measured. The material could not be evaluated in humid aging because of this softness. In all these cases, the postcure temperatures and time are chosen to achieve high level of isocyanate conversion.

With Examples 1-3 the benefit of using higher equivalent weight polyol at high isocyanate index is shown. In each case, the polyols are difunctional and hydroxyl equivalent weight of 1000 or higher. The $T_g$ of the postcured material is 90° C. or above, and above $6×10^8$ Pa for the modulus at 121° C. After humid aging, the glass transition temperature of Examples 1-3 materials actually increased, very substantially, to above 200° C. This value is much higher than any of the other samples (Comparative Examples A, B, and C). Corrected 121° C. G' after humid aging also increased, which is contrary to the behavior of Comparative Examples A, B, and C.

The formulations and test results for Examples 4-7 are given in Table 2, below.

TABLE 2

|  | Example 4 | Example 5 | Example 6 | Example 7 |
|---|---|---|---|---|
|  |  | Parts by Weight |  |  |
| Formulation |  |  |  |  |
| Polyol E | 2.5 | 3.8 |  |  |
| Filled Polyol A |  |  | 2.5 |  |
| Filled Polyol B |  |  |  | 2.5 |
| Polyisocyanate A | 30 | 30 | 30 | 30 |
| Trimerization Catalyst A | 0.30 | 0.26 | 0.30 | 0.50 |
| Urethane Catalyst A | 0 | 0 | 0 | 0.04 |
| Isocyanate Index | 179 | 118 | 235 | 159 |
| Postcure temperature (° C.)/time (min) | 120/60 | 120/60 | 120/60 | 120/60 |
| Properties |  |  |  |  |
| $T_g$ after postcure (° C.) | 172 | 163 | 230 | 160 |
| Corrected 121° C. G' on postcured sample ($10^8$ Pa) | 7.8 | 8.7 | 7.1 | 7.4 |
| $T_g$ after humid aging (° C.) | 207 | 231 | 235 | 192 |

TABLE 2-continued

|  | Example 4 | Example 5 | Example 6 | Example 7 |
|---|---|---|---|---|
|  |  | Parts by Weight |  |  |
| Corrected 121° C. G' on humid aged sample ($10^8$ Pa) | 5.5 | 6.8 | 6.2 | 3.7 |

For Examples 4 and 5, the polyol (Polyol E) is a trifunctional polyether polyol with mainly primary hydroxyl end groups. For Examples 6 and 7, the polyols are filled polyols. The $T_g$ of the postcured samples in Examples 4-7 was 160° C. or above, and above $7×10^8$ Pa for the modulus at 121° C. After humid aging, the $T_g$ for each of Examples 4-7 increased. This value is much higher than Comparative Examples A, B, and C. Corrected 121° C. G' also increased after humid aging, which is contrary to the behavior of the Comparative Examples A, B, and C.

What is claimed is:

1. A method for exposing a substrate to water in that is at least partly in the form of a liquid at a temperature of 70° C. to 140° C. and a pressure of 150 kPa to 5000 kPa, the method comprising:
    (a) applying a reaction mixture to a substrate, which reaction mixture has an isocyanate index of at least 10 and includes an aromatic polyisocyanate component, a polyol component having a polyol with a hydroxyl equivalent weight of at least 500, and a catalyst component having an isocyanate trimerization catalyst, and at least partially curing the reaction mixture to form a polyisocyanurate or polyurethane-isocyanurate polymer having a glass transition temperature of at least 80° C., and
    (b) exposing the substrate and the polyisocyanurate or polyurethane-isocyanurate polymer to water in that is at least partly in the form of a liquid at a temperature of 70° C. to 140° C., and a pressure of 150 kPa to 5000 kPa.

2. The method as claimed in claim 1, wherein the polyol is a filled polyol or a polyester polyol.

3. The method as claimed in claim 1, wherein the polyol is a reactive carrier for the isocyanate trimerization catalyst.

4. The method as claimed in claim 1, wherein stage (a) is performed in the absence of a blowing agent to produce the polyisocyanurate or polyurethane-isocyanurate polymer having a density of at least 750 kg/m³.

5. The method as claimed in claim 1, wherein stage (a) is performed in the absence of a blowing agent to produce the polyisocyanurate or polyurethane-isocyanurate polymer having a density of at least 950 kg/m³.

6. The method as claimed in claim 1, wherein after stage (b) the polyisocyanurate or polyurethane-isocyanurate polymer has a density of at least 750 kg/m$^3$.

7. The method as claimed in claim 1, wherein after stage (b) the polyisocyanurate or polyurethane-isocyanurate polymer has a density of at least 950 kg/m$^3$.

8. The method as claimed in claim 1, wherein the glass transition temperature of the polyisocyanurate or polyurethane-isocyanurate polymer is between 80° C. to 250° C.

9. The method as claimed in claim 1, wherein, in stage (a) the substrate is a fibrous reinforcement that is then cured to form a fiber-reinforced composite that includes a fiber phase in which the fibrous reinforcement is embedded in and hound together by the polyisocyanurate or polyurethane-isocyanurate polymer.

10. The method as claimed in claim 1, wherein the temperature in stage (b) is from 80° C. to 130° C.

11. The method as claimed in claim 1, wherein stage (b) is performed for a period of time sufficient to increase the glass transition temperature of the polyisocyanurate or polyurethane-isocyanurate polymer by at least 5° C.

12. The method as claimed in claim 1, wherein stage (b) is performed during use of the substrate and the polyisocyanurate or polyurethane-isocyanurate polymer in an intended application.

13. The method as claimed in claim 1, wherein stage (b) is performed as a separate manufacturing stage from the use of substrate and the polyisocyanurate or polyurethane-isocyanurate polymer in an intended application.

* * * * *